United States Patent
Lee et al.

(10) Patent No.: US 7,327,659 B2
(45) Date of Patent: Feb. 5, 2008

(54) METHOD AND APPARATUS FOR RECORDING DATA ON WRITABLE COMPACT DISC

(75) Inventors: Kyung-geun Lee, Gyeonggi-do (KR); In-sik Park, Gyeonggi-do (KR); Du-seop Yoon, Gyeonggi-do (KR); Jung-wan Ko, Gyeonggi-do (KR); Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 665 days.

(21) Appl. No.: 10/310,996

(22) Filed: Dec. 6, 2002

(65) Prior Publication Data
US 2003/0133385 A1 Jul. 17, 2003

(30) Foreign Application Priority Data
Dec. 18, 2001 (KR) ................. 2001-80905

(51) Int. Cl.
*G11B 7/0045* (2006.01)
(52) U.S. Cl. ................. 369/59.24; 369/44.27
(58) Field of Classification Search ............ 369/59.24, 369/44.27
See application file for complete search history.

(56) References Cited

U.S. PATENT DOCUMENTS

| | | | | |
|---|---|---|---|---|
| 5,936,933 | A * | 8/1999 | Miyamoto et al. ....... | 369/275.3 |
| 6,091,561 | A * | 7/2000 | Hamaguchi ................ | 360/64 |
| 6,281,815 | B1 | 8/2001 | Shim et al. | |
| 6,338,155 | B1 * | 1/2002 | Noda ........................ | 714/763 |
| 6,339,571 | B1 * | 1/2002 | Torazawa et al. ......... | 369/53.2 |
| 6,801,490 | B1 * | 10/2004 | Sako et al. .............. | 369/53.31 |
| 6,804,190 | B2 * | 10/2004 | Ishida et al. ............. | 369/275.4 |
| 2001/0024410 | A1 | 9/2001 | Kumai et al. | |
| 2001/0040846 | A1 | 11/2001 | Kawashima et al. | |
| 2002/0157045 | A1 | 10/2002 | Hwang et al. | |
| 2002/0181365 | A1 | 12/2002 | Nakajo | |
| 2003/0012110 | A1 * | 1/2003 | Senshu .................... | 369/59.13 |

FOREIGN PATENT DOCUMENTS

| | | |
|---|---|---|
| EP | 0 803 871 | 10/1997 |
| EP | 0 978 830 | 2/2000 |

(Continued)

OTHER PUBLICATIONS

European Search Report issued Apr. 12, 2007 by the European Patent Office re: European Application No. 02256332.4-1232 (8 pp).

(Continued)

*Primary Examiner*—Gautam R. Patel
(74) *Attorney, Agent, or Firm*—Stein, McEwen & Bui, LLP

(57) ABSTRACT

A method of recording data on a compact disc is provided includes modulating the data of 1 byte to p-channel bits, recording the modulated data when a minimum mark length is greater than 0.5 μm and smaller than 1.0 μm, p/q is greater than 4.5 and smaller than 8 when the minimum mark length corresponds to q-channel bits, and a format efficiency is greater than 0.6 and smaller than 1.0. Thus, data can be recorded on an existing compact disc at a higher density.

22 Claims, 19 Drawing Sheets

FOREIGN PATENT DOCUMENTS

| | | |
|---|---|---|
| EP | 1 047 197 | 10/2000 |
| EP | 1 150 291 | 10/2001 |
| EP | 1 324 335 | 7/2003 |
| JP | 9-259513 | 10/1997 |
| JP | 2001101806 | 4/2001 |
| JP | 2001-344751 | 12/2001 |
| JP | 2002-25064 | 1/2002 |
| KR | 2000-67781 | 11/2000 |
| KR | 2002-82385 | 10/2002 |
| WO | WO 92/21125 | 11/1992 |

OTHER PUBLICATIONS

"Data interchange on read-only 120 mm optical data disks", Standard ECMA-130, 2$^{nd}$ edition—Jun. 1996.

Search Report issued in European Patent Application No. 02256332.4 on Nov. 6, 2006.

\* cited by examiner

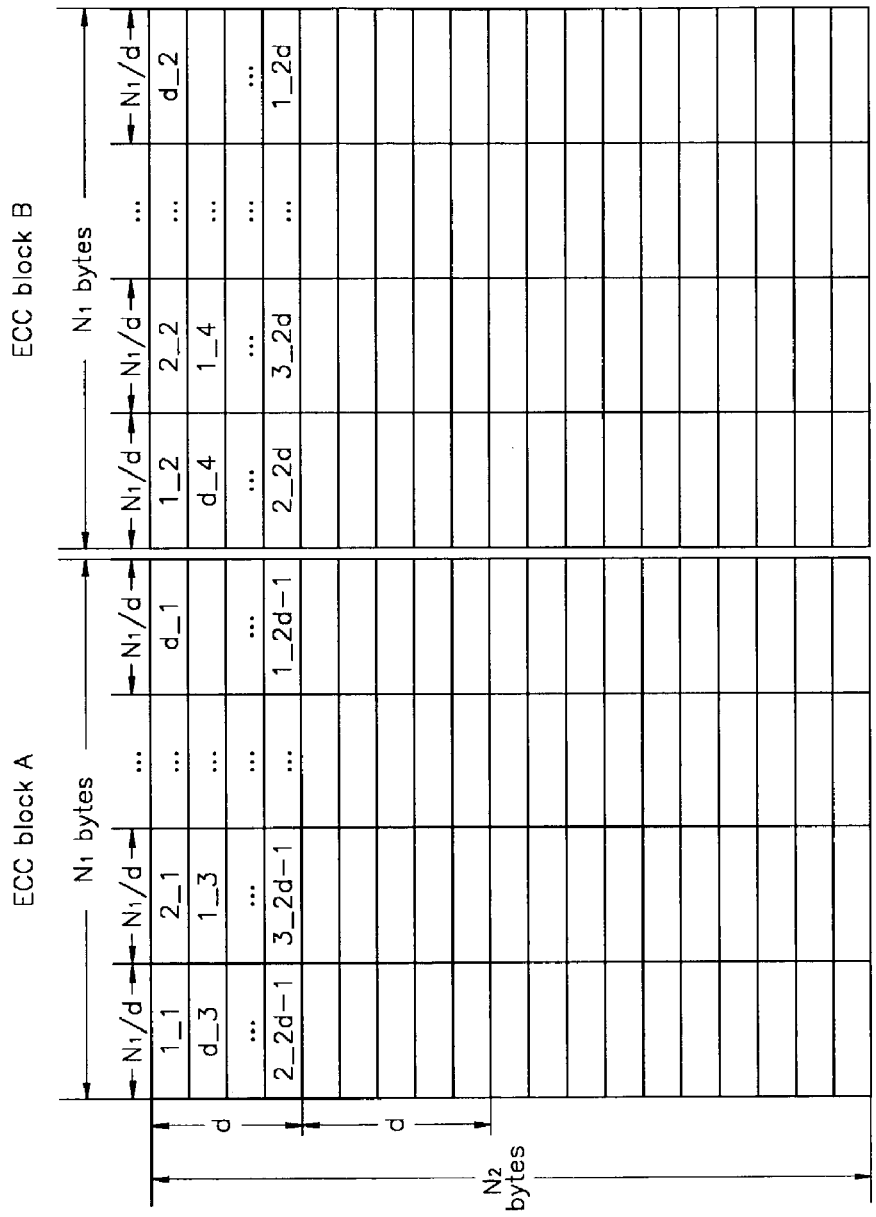

FIG. 9A
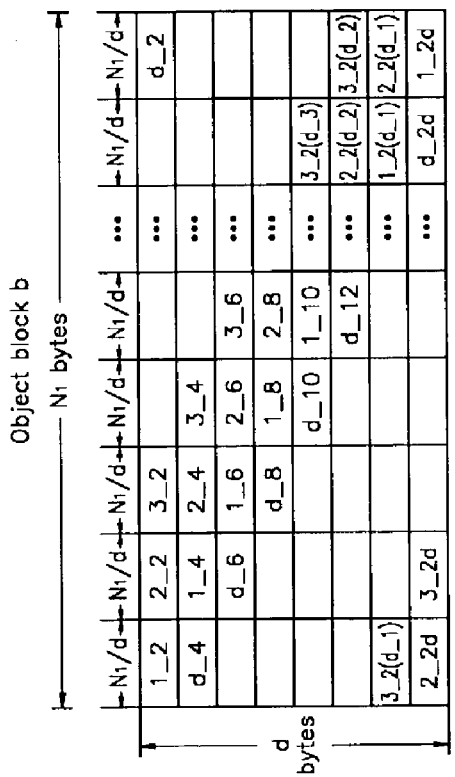
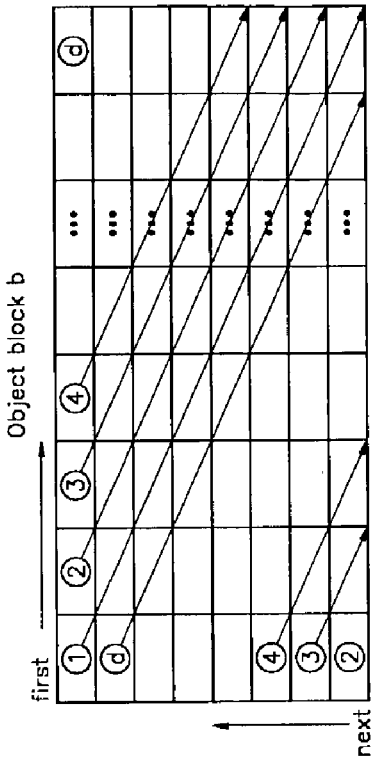
FIG. 9B
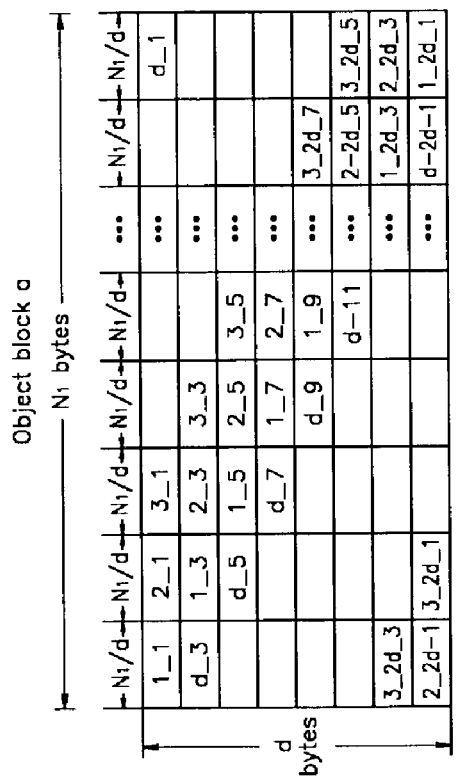
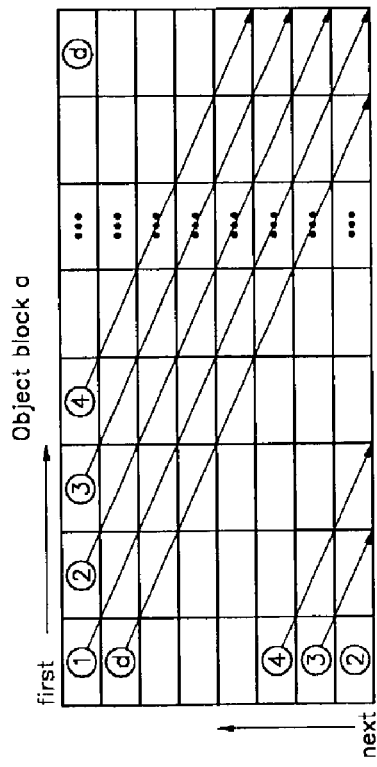

METHOD AND APPARATUS FOR RECORDING DATA ON WRITABLE COMPACT DISC

CROSS-REFERENCE TO RELATED APPLICATION

This application claims the benefit of Korean Patent Application No. 2001-80905, filed Dec. 18, 2001 in the Korean Intellectual Property Office, the disclosure of which is incorporated herein by reference.

BACKGROUND OF THE INVENTION

1. Field of the Invention

The present invention relates to a method and an apparatus for recording data on a recordable disc, and more particularly, to a method and an apparatus for recording data on an existing recordable compact disc at a high density.

2. Description of the Related Art

Since video or audio data having large capacity are frequently transmitted and received over the Internet, there has arisen a need for a high-density recording medium with respect to which the data is easily recorded/reproduced. Recordable optical discs include CD-R/RWs having a capacity of 650 MB, DVD-RAM/R/RWs having a capacity of 4.7 GB, DVD+RWs having a capacity of 4.7 GB, and the like. Also, research on and the development of HD-DVDs having a recording capacity of more than 20 GB have been in progress. For DVDs, whereas DVD-ROMs are in widespread use by general users, DVD-RAM/R/RWs, DVD+RWs, and recording apparatuses capable of recording user data on DVD-RAM/R/RWs and DVD+RWs are not as widely accepted by general users.

However, CD-R/RWs are widely used as recordable optical discs. While data can be recorded only one time on CD-Rs, data can be repeatedly rewritten on CD-RWs. Further, only about 650 MB of user data can be recorded on CD-Rs and CD-RWs. Thus, Sony and Philips have developed and sold 1.3 GB double density compact discs (DDCD), which have a recording capacity that is nearly double that of the CD-R/RWs. FIGS. 1A and 1B are reference views for explaining differences between a DDCD and an existing CD. Referring to FIG. 1A, the DDCD has the same size as the existing CD shown in FIG. 1B. However, the DDCD has a track pitch of 1.1 µm, which is narrower than the track pitch of 1.6 µm of the existing CD. The DDCD has a minimum mark length (MML) of 0.623 µm, which is shorter than the MML of 0.833 µm of the CD. The numerical aperture (NA) of an optical pickup for the DDCD is 0.55 (reproducing/recording), which is about 10% greater than the NA of an optical pickup for the CD. The spot diameter of a laser beam for the DDCD is 1.17 µm, which is shorter than the spot diameter of 1.29 µm of a laser beam for the CD.

A simple method of increasing the recording density when changing the specifications of a pickup is to reduce the spot diameter of a laser beam for recording. Since the spot diameter is proportional to a wavelength λ of a light source and inversely proportional to the NA of an objective lens, the spot diameter can be reduced by (1) shortening the wavelength λ of the light source wavelength or (2) increasing the NA of the objective lens.

For the DDCD, the spot diameter can be theoretically reduced only by the second method. This is because it is highly possible to change parts of the pickup and the structure of the DDCD if the wavelength λ of the light source is changed. However, since in the DDCD case, the spot diameter reduces by 10% compared to the spot diameter of the CD, the resolution of a signal obtained from a recording mark becomes insufficient. Thus, a DDCE recording/reproducing apparatus additionally includes an equalizer to supplement the insufficient resolution.

The differences between a DDCD and a CD are summarized in Table 1.

TABLE 1

|  | DDCD-ROM/R/RW | CD-ROM/R/RW |
|---|---|---|
| Recording Capacity | 1.3 GB | 650 MB |
| Specifications of Disc | Diameter 120 mm, Thickness 1.2 mm | |
| Track Pitch | 1.1 µm | 1.6 µm |
| Minimum Mark Length | 0.623 µm | 0.833 µm |
| Error Correcting System | CIRC7 | CIRC |
| Modulation algorithm | EFM | |
| Wavelength of Light Source | About 780 nm | |
| NA of Objective Lens | 0.5 (reproducing), 0.55 (recording/reproducing) | 0.45 (reproducing), 0.50 (recording/reproducing) |
| Spot Diameter | 1.17 µm | 1.29 µm |

Here, EFM denotes an Eight-to-Fourteen Modulation process, CIRC denotes a Cross Interleave Reed-Solomon Code, and the spot diameter is a diameter in which the intensity of a laser beam is equal to the central intensity $1/e^2$ (e is a natural great number).

Compared with the specifications of a CD, the specifications of a DDCD are as follows:
(1) The NA of the objective lens increases.
(2) The MML and the track pitch become short.
(3) An equalizer is added to the recording/reproducing apparatus.
(4) Efficiency of the error correcting system is strengthened.

In other words, in the DDCD case, the spot diameter is shortened (specification (1)), the MML is reduced (specification (2)), and the resolution which is lowered through specification (1) is solved by increasing the efficiency of processing a signal through specification (4).

However, a tilt allowance (tilt margin) is reduced due to specification (1). Since the tilt allowance is inversely proportional to the cube of the NA, the tilt allowance reduces by about 25%. Also, the MML and the track pitch are reduced by 25% and 31%, respectively, through specification (2). However, since the spot diameter is reduced by about 10% through specification (1), the reduction ratios of the MML and the track pitch are greater than the reduction ratio of the spot diameter. Thus, there is an increase in cross erase or crosstalk between adjacent tracks and interference between adjacent marks when recording/reproducing data.

To solve these problems, when the allowable assembling error of a pickup device is reduced or a crosstalk canceller or a laser beam former is added, the manufacturing cost of the recording/reproducing apparatus increases more and more. Further, a user has to buy a new disc.

SUMMARY OF THE INVENTION

To solve the above and other problems, it is an object of the present invention to provide a method and an apparatus for recording data on an existing compact disc at a higher density.

It is another object of the present invention to provide a method and an apparatus for recording data on an existing compact disc at a higher density using an existing pickup device.

It is still another object of the present invention to provide a method and an apparatus for recording data on an existing compact disc by selecting any one of an existing recording method and a high-density recording method.

Additional objects and advantages of the invention will be set forth in part in the description which follows and, in part, will be obvious from the description, or may be learned by practice of the invention.

To achieve the above and for other objects, according to an embodiment of the present invention, there is provided a method of recording data on a compact disc, where the method includes modulating data of 1 byte to p-channel bits, and recording data when a minimum mark length is between 0.5 µm and 1.0 µm, p/q is between 4.5 and 8 when the minimum mark length corresponds to q-channel bits, and a format efficiency is between 0.6 and 1.0.

According to an aspect of the invention, in the recording the data, a wavelength of a recording beam is 780 nm, a spot diameter is 1.56 µm, and a numerical aperture is 0.5.

According to another aspect of the invention, the recording the data further comprises recording user data by using one of a first writing mode having a first writing density and a second writing mode having a different recording density than the first recording density.

According to yet another aspect of the invention, the first writing mode is a writing mode of an existing compact disc, and the second writing mode is a writing mode in which the user data is recorded when a minimum mark length is between 0.5 µm and 1.0 µm, p/q is between 4.5 and 8 when the minimum mark length corresponds to q-channel bits, and a format efficiency is between 0.6 and 1.0.

According to still another aspect of the invention, the modulating the data comprises creating an error correcting code block, performing interleaving, and modulating data of the 1 byte to about 15.3 channel bits by a dual modulation algorithm.

According to still yet another aspect of the invention, in the modulating the data, a minimum mark length is 0.627 µm, a wavelength of a recording beam is 780 nm, a spot diameter is 1.56 µm, and a numerical aperture is 0.5.

According to a further embodiment of the invention, a method of recording data on a compact disc having a plurality of physical sectors designated by addressing information that is recorded in a mastering process, the method including recording 62 frames, each frame having a sync code and data, in the physical sectors, a minimum mark length is between 0.5 µm and 1.0 µm, p/q is between 4.5 and 8 when the minimum mark length corresponds to q-channel bits, and a format efficiency is between 0.6 and 1.0.

According to an aspect of the invention, the recording the 62 frames includes allocating error detecting codes to main data and header information, performing error correcting code encoding, performing interleaving, creating each of the frames by adding a sync code of 2 bytes to data of 77 bytes, and recording the created 62 frames in the physical sectors.

According to another aspect of the invention, the performing the interleaving includes dividing two error correcting code blocks of N1×N2 bytes into blocks of d bytes that represent the greatest common divisor along a column, respectively, dividing the object blocks of d×N1 bytes into d parts along a row and a column, respectively, to obtain partitions of d×d, and interleaving data in a predetermined partition by alternatively selecting the two error correcting code blocks to obtain a recording block having line-code words of 2×N2.

According to still another aspect of the invention, the error correcting code blocks has line-code words (N1, k1) and column-code words (N2, k2), respectively, and the performing the interleaving further includes modulating the recording block having line-code words of 2×N2 to generate a recording block having a main data area of 2×(N2−k2) and an outer parity area of 2×k2.

According to a further embodiment of the present invention, an apparatus for recording and/or reproducing data on a compact disc includes a pickup unit to record a mark on the compact disc, a modulator to modulate data of 1 byte to p-channel bits, and a controller to control the pickup unit to record data modulated by the modulator when a minimum mark length is between 0.5 µm and 1.0 µm, p/q is between 4.5 and 8 when the minimum mark length corresponds to q-channel bits, and a format efficiency is between 0.6 and 1.

According to an aspect of the invention, the controller controls the pickup unit so as to record the data when a wavelength of a recording beam is 780 nm, a spot diameter is 1.56 µm, and a numerical aperture is 0.5.

According to still another embodiment of the invention, an apparatus for recording data on a compact disc includes a pickup unit to record a mark on the compact disc, a modulator to modulate the data to predetermined channel bits, and a controller to control the pickup unit so as to record the modulated data in a selected one of a first writing mode having a first recording density and a second writing mode having a different recording density than the first recording density.

According to an aspect of the invention, the controller controls the pickup unit so that a minimum mark length is between 0.5 µm and 1.0 µm, p/q is between 4.5 and 8 when the minimum mark length corresponds to q-channel bits, and a format efficiency is between 0.6 and 1.0.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee. These and other objects and advantages of the invention will become apparent and more readily appreciated from the following description of the embodiments, taken in conjunction with the accompanying drawings of which:

FIGS. 8A, 8B, 9A and 9B are reference views for explaining an interleaving algorithm according to an error correcting system used in another embodiment of the present invention;

DETAILED DESCRIPTION OF THE EMBODIMENTS

Figure 1A:
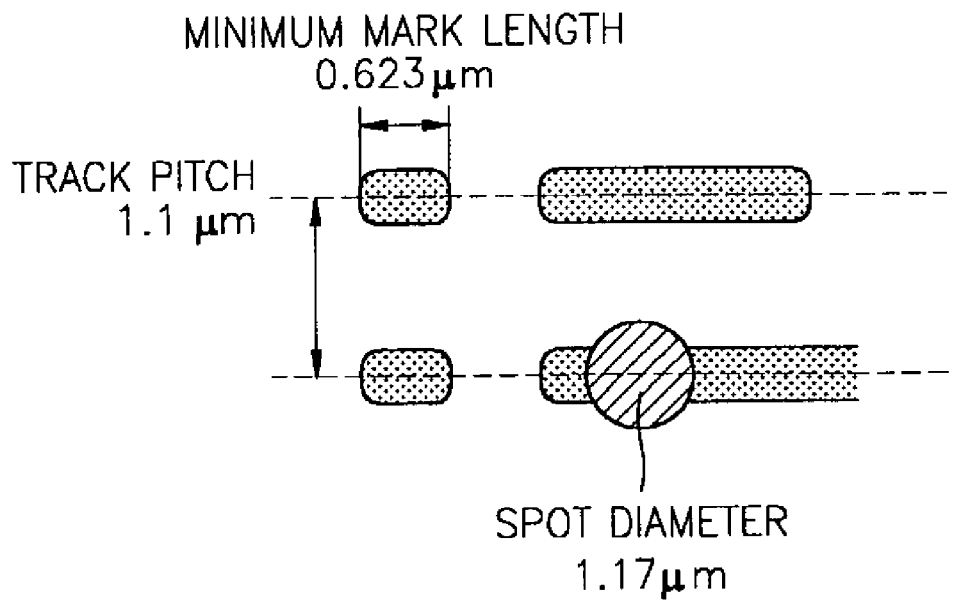
FIGS. 1A and 1B are reference views for explaining differences between a DDCD and an existing CD.
Figure 1B:
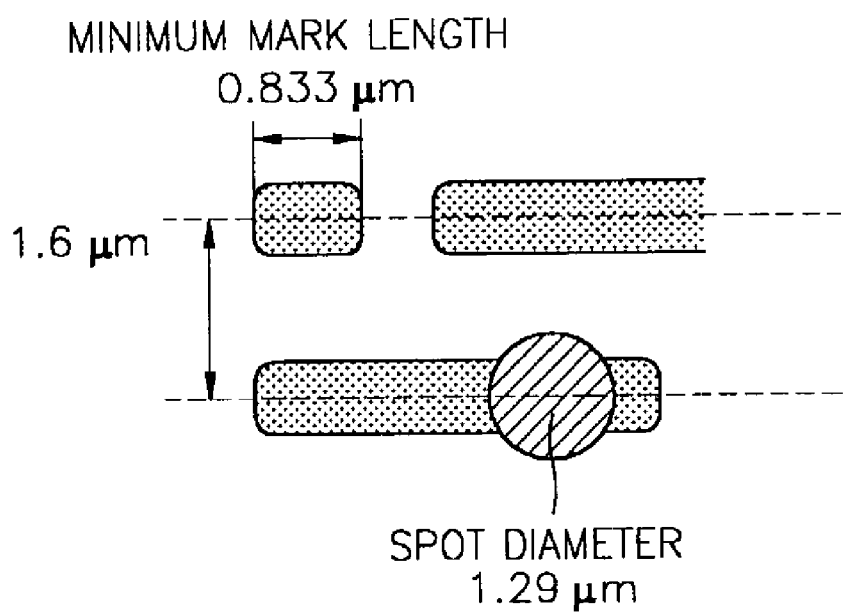

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
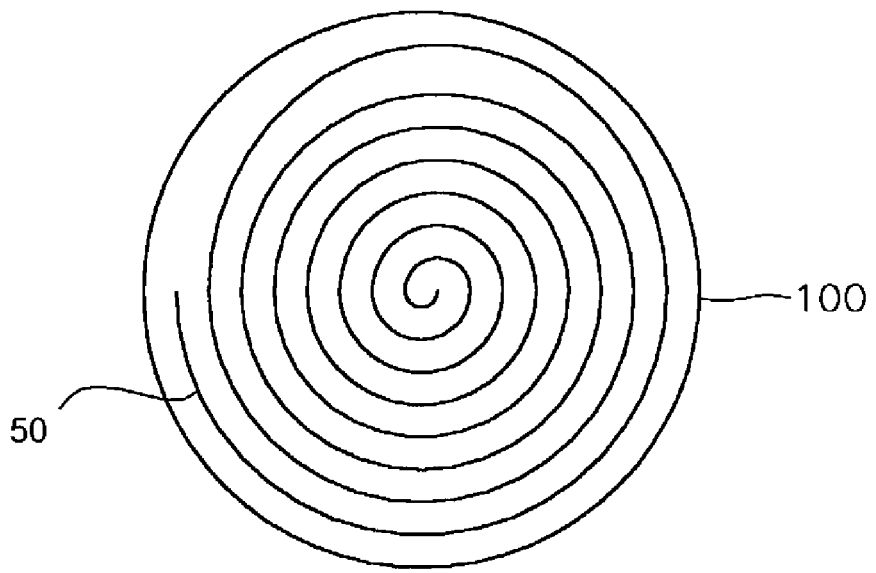
FIGS. 2A and 2B are schematic views of a compact disc.
Figure 2B:
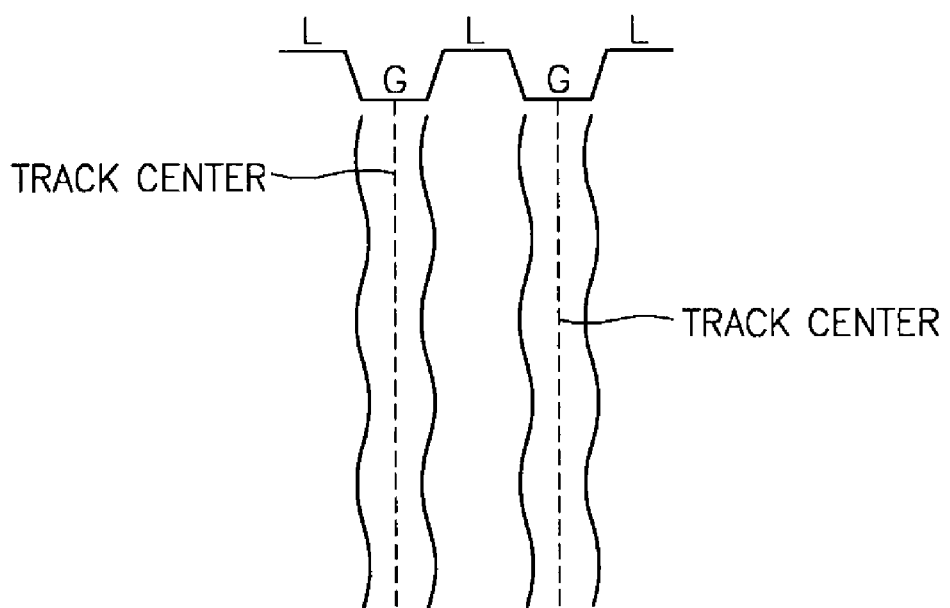

FIGS. 2A and 2B are schematic views of a compact disc. Referring to FIG. 2A, a spiral track 50 is formed in a recordable compact disc 100. The track 50 includes land tracks L and groove tracks G as shown in FIG. 2B. The groove tracks G are wobbled by about ±0.03 µm in the radial direction of the recordable compact disc 100. Signals are detected from the wobbled tracks through a push-pull channel and are called "wobble signals". A wobble signal includes absolute time information on a disc (i.e., Absolute Time In Pregroove (ATIP) information) a frequency of which is modulated. The ATIP information is a type of address information. Thus, one physical sector area is determined depending on the ATIP information. As a result, one physical sector area of the recordable compact disc 100 is called "one ATIP area."

Figure 3:
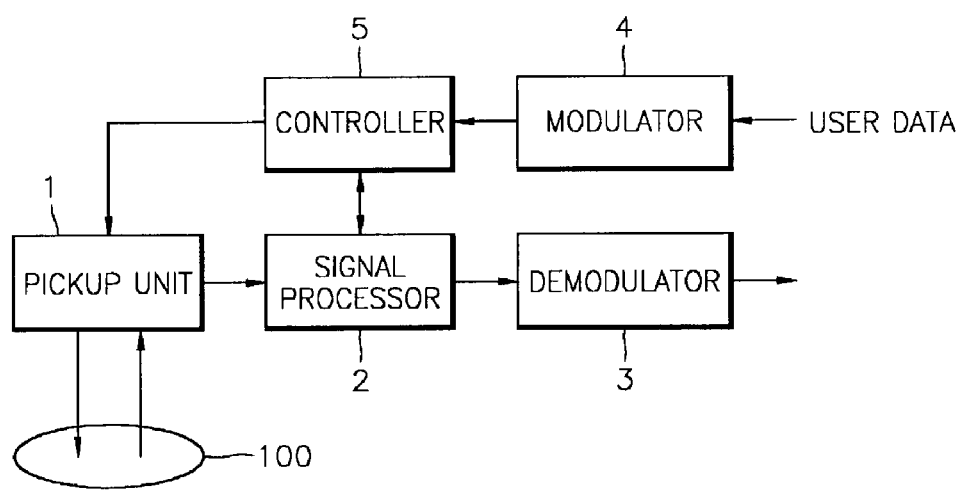
FIG. 3 is a block diagram of a recording apparatus according to an embodiment of the present invention.

FIG. 3 is a block diagram of a recording apparatus according to an embodiment of the present invention. Referring to FIG. 3, the recording apparatus records user data on the recordable compact disc 100 in a recording format according to the present invention. The recording apparatus includes a pickup unit 1, a signal processor 2, a demodulator 3, a modulator 4, and a controller 5. It is understood that ones of the signal processor 2, the demodulator 3, the modulator 4, and the controller 5 according to the present invention can be a computer or computers, whereby the operations of the signal processor 2, the demodulator 3, the modulator 4, and/or the controller 5 are implemented using computer software encoded on a computer readable medium readable by the computer or computers.

The pickup unit 1 includes a laser diode which generates a laser beam so as to radiate the laser beam onto the recordable compact disc 100, record user data or receive the reflected laser beam, and detect a radio frequency (RF) signal. The signal processor 2 amplifies the detected RF signal and removes noise from the RF signal. The demodulator 3 demodulates and outputs user data (i.e., video/audio data) from the signal processed by the signal processor 2. The modulator 4 receives the user data and modulates the user data by a predetermined modulation algorithm. The controller 5 detects address information used for recording the user data from the signal processed by the signal processor 2 and controls the pickup unit 1 based on the address information to record the user data modulated by the modulator 4 on the compact disc 100.

Figure 4:
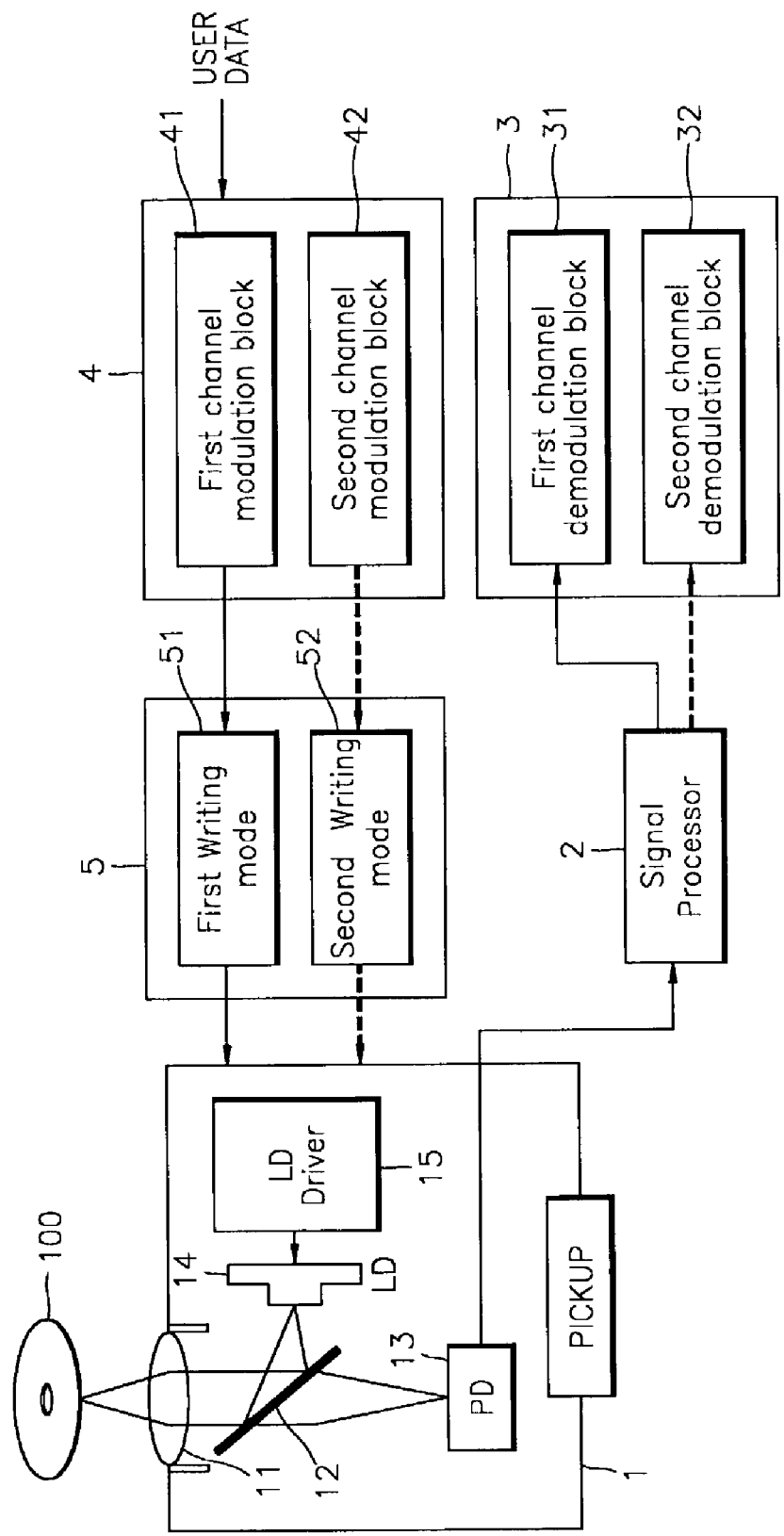
FIG. 4 is a block diagram of a recording apparatus based on the design shown in FIG. 3.

FIG. 4 is a block diagram of an implementation of a recording apparatus based on the design shown in FIG. 3. Blocks which substantially perform the same functions as those of blocks of FIG. 3 are denoted by the same reference numerals and their detailed descriptions will be omitted.

Referring to FIG. 4, the recording apparatus records user data on the recordable compact disc 100 by a compact disc recording method or a high-density recording method according to the present invention. The recording apparatus includes a pickup 1, a signal processor 2, a demodulator 3, a modulator 4, and a controller 5.

The pickup 1 includes a laser 14 which generates laser beams, a laser diode (LD) driver 15 which controls the driving of the laser 14, an objective lens 11 which condenses the laser beams to radiate the laser beams onto the recordable compact disc 100, a beam splitter 12 which splits the laser beams into radiated beams and reflected beams, and a photo detector (PD) 13 which receives beams reflected from the recordable compact disc 100. When recording user data, the pickup 1 changes the minimum mark length (MML) depending on whether a first writing mode or a second writing mode is selected. While not shown, it is understood that additional laser diodes, photo detectors and beam splitters can be used so that the apparatus can be compatible with other types of optical recording media.

The modulator 4 includes a first channel modulation block 41 and a second channel modulation block 42. The first channel modulation block 41 receives the user data and modulates channel bits according to a first recording format. The second channel modulation block 42 receives user data that is encoded by a predetermined method and modulates channel bits according to a second recording format. In this embodiment, the first recording format represents an existing recording format and the second recording format represents a high-density recording format according to the present invention. Since the recordable compact disc 100 uses Eight-to-Fourteen Modulation (EFM) method, the first channel modulation block 41 modulates data of 1 byte to 14 channel bits. The second channel modulation block 42 modulates data of 1 byte to 15.3 channel bits according to a Dual modulation algorithm. The Dual modulation algorithm is disclosed in Korean Patent Application No. 99-42032 entitled "Method of Arranging RLL Codes Having Improved DC Suppression Capabilities, Demodulation and Modulation algorithm, and Demodulating Apparatus", filed on Sep. 30, 1999 by the applicant of the present invention and published on Nov. 25, 2000, and in U.S. Pat. No. 6,281,815, the disclosures of which are incorporated herein by reference. In the Dual modulation algorithm, a pair of code groups is arranged such that DC suppression of a code sequence can be controlled. In addition, signs of a parameter CSV are used, where CSV represents a DC value in a code word of a code corresponding to the same source code in the pair of code groups. Further, codes (1, 8, 8, 12) are arranged so that characteristics of a parameter INV for estimating a Digital Sum Value (DSV) transition direction of a next code word are opposite to one another. More detailed contents are disclosed in the publication of Korea Patent Application No. 99-42032 and in U.S. Pat. No. 6,281,815.

The controller 5 provides a control command in the first writing mode according to the first recording format or in the second writing mode according to the second recording format to the LD driver 15. As a result, the user data is recorded on the recordable compact disc 100. Detailed descriptions of the second writing mode will be described later.

The demodulator 3 includes a first channel demodulation block 31 and a second demodulation block 32. A demodulation algorithm depends on the modulation algorithm. Thus, the first channel demodulation block 31 extracts a channel bit sequence from a RF signal processed by the signal processor 2 and demodulates channel bits to data bits according to the first recording format. The second channel demodulation block 32 extracts a channel bit sequence from a signal processed by the signal processor 2 and demodulates channel bits to data bits according to the second recording format.

A disc 100 on which data is recorded by the high-density recording method according to the present invention is called herein "GD" for convenience, and stands for a Giga Disc. A writing mode of the GD (i.e., the second writing mode), meets the following requirements.

When modulating data of 1 byte to p-channel bits, the MML is between 0.5 μm and 1.0 μm. Also, when the MML corresponds to q-channel bits, p/q is between 4.5 and 8 (where p and q are integers which indicate the number of p-channel and q-channel bits, respectively) and a format efficiency is between 0.6 and 1.0. The format efficiency refers to a ratio of the amount of user data to the whole amount of recorded data. The total amount of the recorded data for the same user data may vary depending on the formatting methods. The above-described requirements are shown in Table 2.

TABLE 2

| | |
|---|---|
| Minimum Mark Length (MML) | 0.5 μm < MML < 1.0 μm |
| p/q | 4.5 < p/q < 8 |
| Format Efficiency $e_f$ | 0.6 < $e_f$ < 1.0 |

The comparison between the specifications of the GD according to the present invention and the specifications of an existing recordable compact disc is shown in Table 3. A GD-R is a GD on which data can be recorded only one time and a GD-RW is a GD on which data can be repeatedly recorded.

TABLE 3

| | | GD-R/RW | CD-R/RW |
|---|---|---|---|
| Specifications of Disc | Diameter | 120 mm | 120 mm |
| | Thickness | 1.2 mm | 1.2 mm |
| | Recording Capacity | 1.3 GB | 650 MB |
| | Track Pitch | 1.6 μm | 1.6 μm |
| | MML | 0.627 μm | 0.833 μm |
| | Address Recording Method | ADIP | ADIP |

TABLE 3-continued

| | | GD-R/RW | CD-R/RW |
|---|---|---|---|
| Pickup | Wavelength of Light Source | 780 nm | 780 nm |
| | NA of Objective Lens | 0.5 | 0.5 |
| | Spot Diameter | 1.56 μm | 1.56 μm |
| | Spot Diameter/MML | 2.49 | 1.87 |

In Table 3, it can be seen than the GD-R/RW disc specifications and the specifications of the pickup for the GD-R/RW are identical to the disc specifications and the specifications of the pickup for the recordable compact disc except for the MML. Thus, it is possible to record data at a high density according to a GD method by using the recordable compact disc as it is. Also, it is possible to record data by using a conventional pickup, as it is as well. However, the MML has to be changed.

Table 4 shows the comparison of a modulation algorithm and an encoding method used as an example for the GD recording method and those of the recordable compact disc.

TABLE 4

| | | GD-R/RW | CD-R/RW |
|---|---|---|---|
| | Modulation algorithm | Dual (8/15.3) | EFM (8/14) |
| Encoding Method | Size of Sector | 4 KB | 2 KB |
| | Error correcting system | BCIS-RSPC | CIRC |
| | Size of ECC Block | 32 KB | 2 KB |
| | Format Efficiency | 85% | 60.4% |

Here, when the size of a sector is 4 KB, two physical sectors (4 KB) are recorded in an ATIP area (a physical sector) of the recordable compact disc as will be described later.

Figure 5:
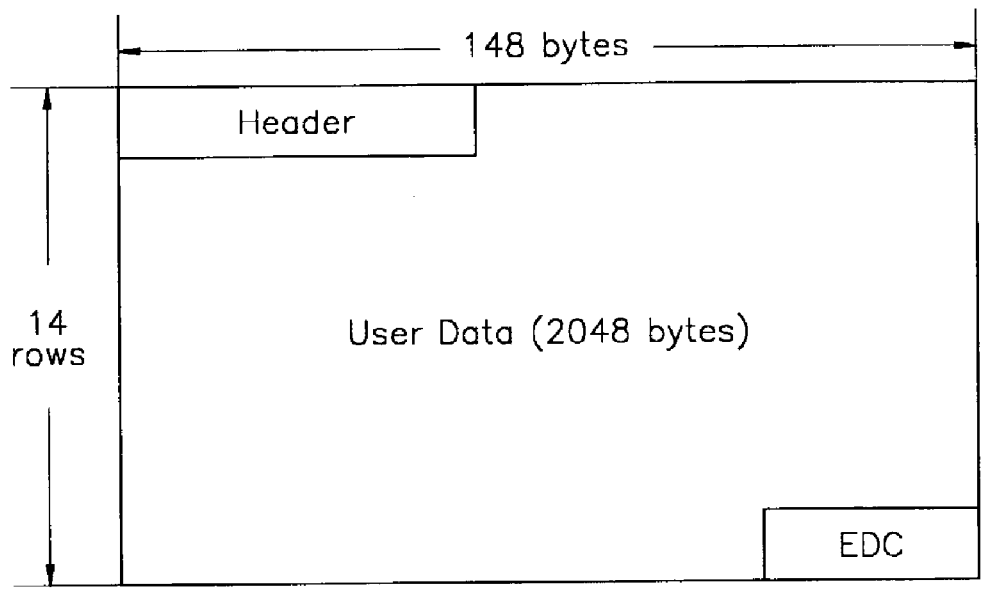
FIG. 5 is a view of the configuration of a logic sector according to a modulation algorithm from Table 4.

FIG. 5 shows the configuration of one logic sector according to the modulation algorithm in Table 4. Referring to FIG. 5, a logic sector has the size of 172×14 bytes according to this embodiment and is composed of user data of 2048 bytes, header information of 20 bytes, and an error detecting code (EDC) of 4 bytes.

The error correcting system depends on BCIS-RSPC, which refers to an error correcting algorithm disclosed in Korean Patent Application No. 01-40897 entitled "Optical Information Storing Medium and Apparatus and Method for Recording Data," filed on Jul. 1, 2001 by the applicants of the present invention, and U.S. Patent Publication No. 2002-0157045, the disclosures of which are incorporated herein by reference. The error correcting algorithm according to BCIS-RSPC is as follows.

Figure 6:
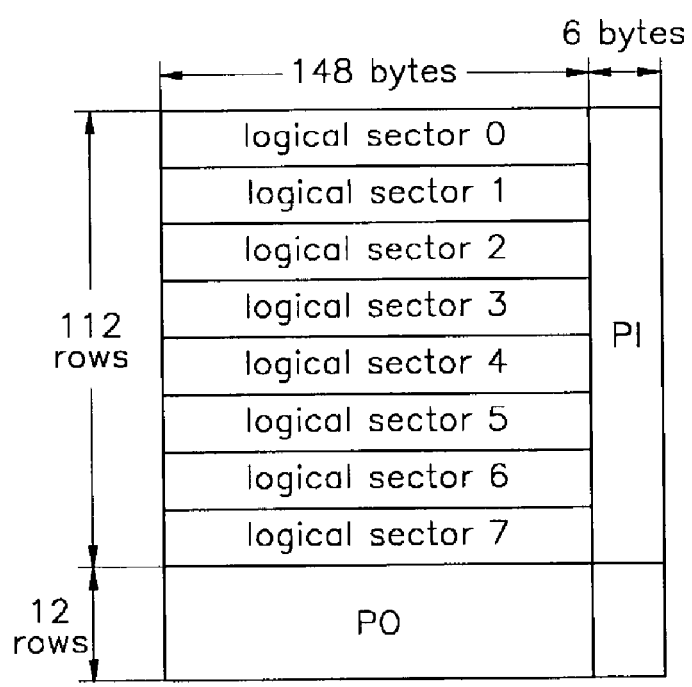
FIGS. 6, 7A and 7B are views of different configurations of an ECC block according to an embodiment of the present invention.
Figure 7A:
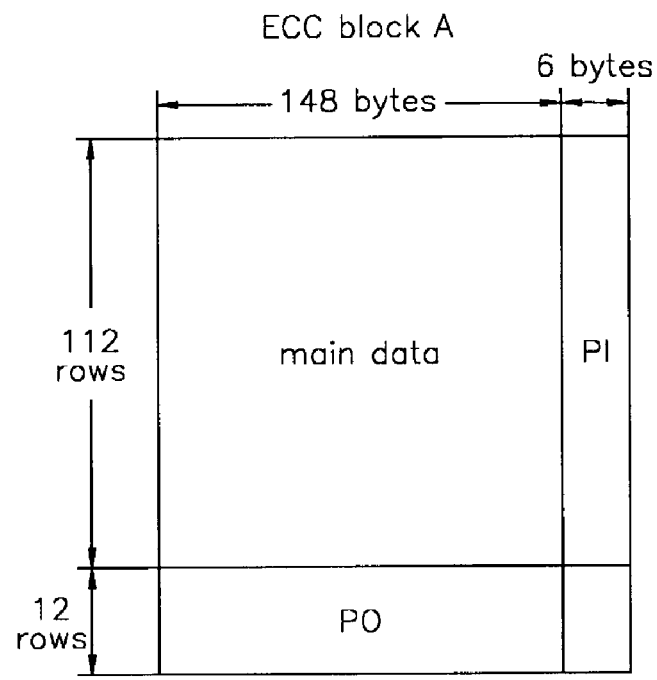
Figure 7B:
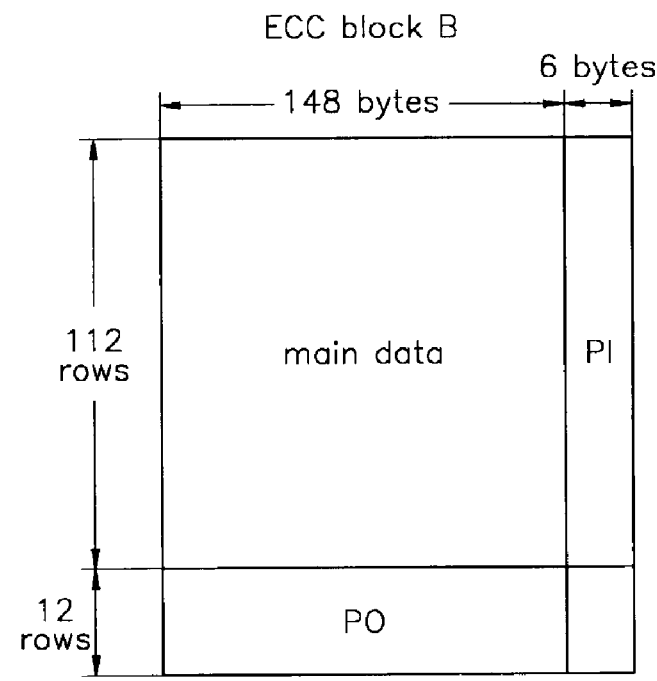

FIGS. 6, 7A and 7B show the configurations of an ECC block according to one embodiment of the present invention. Referring to FIGS. 6, 7A and 7B, the ECC block is composed of 154×124 bytes by adding Parity Inner (PI) and Parity Out (PO) to 8 logic sectors. Code words of data of 148 bytes and PI of 6 bytes are arranged along a row and code words of 112 rows are arranged along a column with a PO of 12 rows. Interleaving, which is a process of the error correcting algorithm used according to one embodiment of the present invention is performed based on ECC blocks A and B. Data, except PI and PO, are called "main data".

FIGS. 8A through 9B are reference views for explaining an interleaving algorithm according to the error correcting system used in the embodiment of the present invention. Referring to FIGS. 8A through 9B, ECC blocks A and B are composed of data of $N_1$ bytes on a row and data of $N_2$ bytes on a column, respectively. The ECC blocks A and B are divided into "d" blocks along a column. Here, "d" is a common divisor of $N_1$ and $N_2$. The divided several blocks are called "object blocks". The interleaving according to this embodiment is performed in the respective object blocks "a" and "b" of ECC blocks A and B.

The interleaving algorithm will now be described in more detail. First, object blocks "a" and "b" are divided along a column based on each line, respectively. Thus, object blocks "a" and "b" are divided into partitions of d×d, respectively. As a result, partitions of 2×d×d are created from object blocks "a" and "b". These partitions are 1_1, 1_2, ..., 1_2, ×d, 2_1, 2_2, ..., 2_2×d, ..., d_1, d_2, ..., d_2×d, each having data of $N_1/d$ bytes.

Next, data is extracted from the partitions in numerical order. In other words, first data is extracted from partition 1_1, second data is extracted from partition 1_2, ..., 2×d$^{th}$ data is extracted from partition 1_2×d, 2×d+1$^{st}$ data is extracted from partition 2_1, 2×d+2$^{nd}$ data is extracted from partition 2_2, ..., 2×d+2×d$^{th}$ data is extracted from partition 2_2×d. Using such order, data is extracted from all of 1_1, 1_2, ..., 1_2×d, and then the data is alternatively extracted from 2_1, 2_2, ..., 2_2×d.

Figure 10:
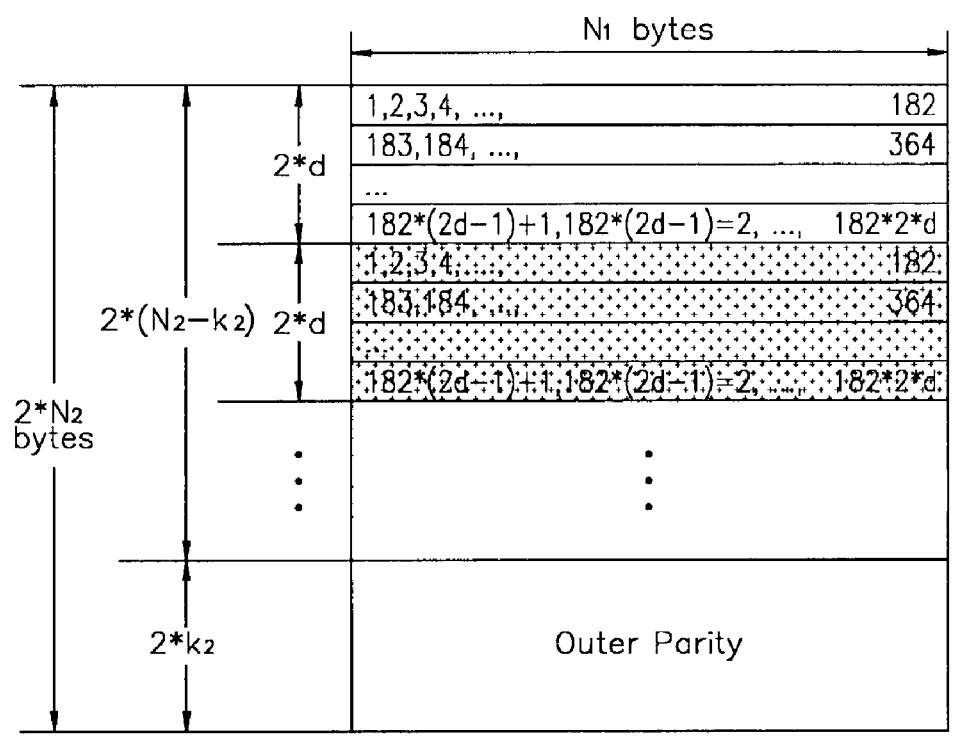
FIG. 10 is a view of the configuration of a block created by carrying out the interleaving algorithm.

This process is repeated on each "d" line. A block created through this process is shown in FIG. 10. Referring to FIG. 10, it can be seen that the created block is composed of data of 2×($N_2$−k2) and an outer parity of 2×k2. Figures recorded along the rows of the block represent consecutive numbers that are allotted to byte data of each partition. In other words, as described with reference to FIGS. 8 and 9, when the interleaving is performed, the byte data is arranged in the order shown in FIG. 10.

For example, a method of allocating consecutive numbers to object blocks "a" and "b" will be described. In other words, since each partition of object blocks "a" and "b" has data of $N_1/d$ bytes, the following consecutive numbers are given to the partitions of object blocks "a" and "b".

Partition 1_1: When the remainder $N_1/d$ of 1, ..., 2×N1 divided by 2×d is 1.
Partition 1_2: When the remainder $N_1/d$ of 1, ..., 2×N1 divided by 2×d is 2.
...
Partition 1_2×d: When the remainder $N_1/d$ of 1, ..., 2×N1 divided by 2×d is 0.
Partition 2_1: When the remainder $N_1/d$ of 2×$N_1$+1, ..., 2×$N_1$+2×$N_1$ divided by 2×d is 1.
Partition 2_2: When the remainder $N_1/d$ of 2×$N_1$+1, ..., 2×$N_1$+2×$N_1$ divided by 2×d is 2.
...
Partition 2_2×d: When the remainder $N_1/d$ of 2×$N_1$+1, ..., 2×$N_1$+2×$N_1$ divided by 2×d is 0.
...
Partition d_1: When the remainder $N_1/d$ of (d−1)×2×$N_1$+1, ..., d×2×$N_1$ divided by 2×d is 1.
Partition d_2: When the remainder $N_1/d$ of (d−1)×2×$N_1$+1, ..., d×2×$N_1$ divided by 2×d is 2
...
Partition d_2×d: When the remainder $N_1/d$ of (d−1)×2×$N_1$+1, ..., d×2×$N_1$ divided by 2×d is 0.

This is generalized as follows.
Partition m_n: When the remainder $N_1/d$ of 2×$N_1$(m−1)+1, ..., 2×m'$N_1$ divided by 2×d is n.

Figure 11:
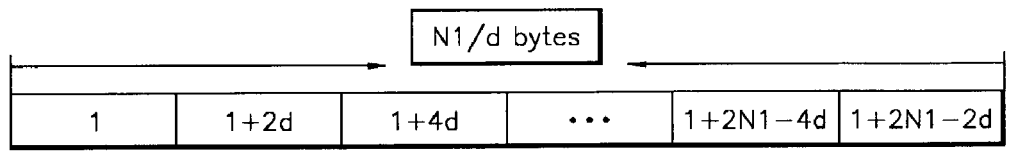
FIG. 11 is a reference view for explaining a method of assigning numbers to data included in an ECC block.

Referring to FIG. 11, for example, numbers 1, 1+2d, 1+4d, ..., 1+2N1−4d, 1+2N1−2d are sequentially given to data of N1/d bytes of partition 1_1. In other words, partition 1_1 has data of N1/d bytes, the first byte of which is given 1, the second byte of which is given 1+2d, the third byte of which is given 1+4d, ..., the (N1/d)−1$^{th}$ byte of which is given 1+2N1−4d, and the N1/d$^{th}$ byte of which is given 1+2N1−2d.

Figure 12:
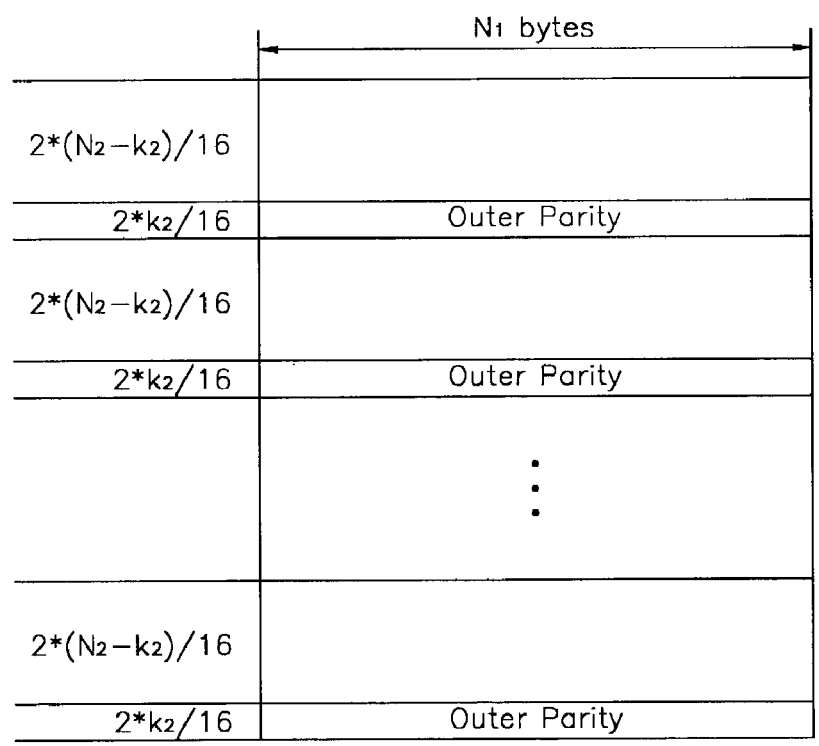
FIG. 12 is a schematic view of a recording block rearranged based on the block shown in FIG. 10.

FIG. 12 schematically shows a recording block rearranged based on the block of FIG. 10. Referring to FIG. 12, the recording block is created by inserting PO of 2×k2 in the block of FIG. 10 at every 2×k2/16 lines.

Figure 13:
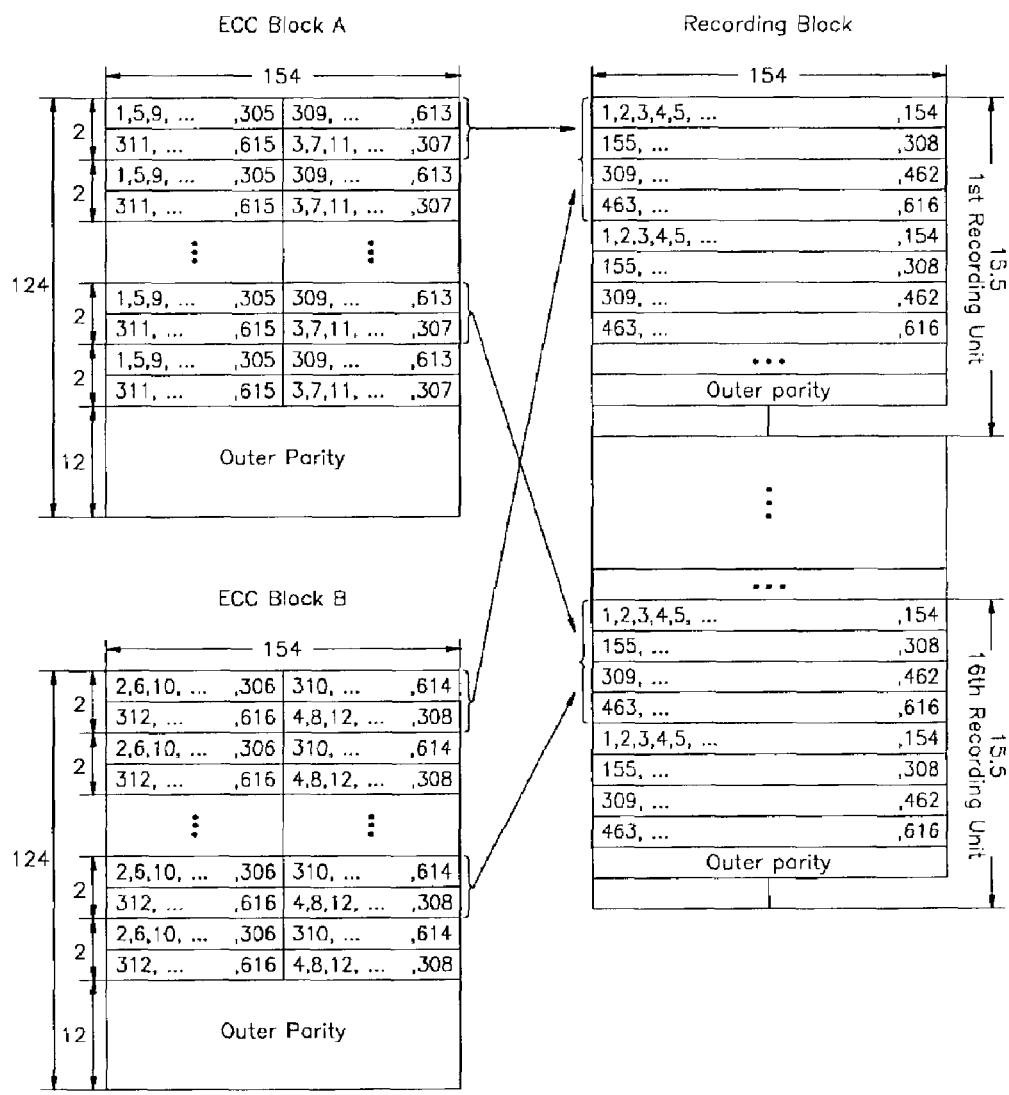
FIG. 13 is a reference view for explaining a process of creating a recording block by substantially performing interleaving in ECC blocks A and B according to an embodiment of the present invention.

FIG. 13 is a view for explaining a process of creating a recording block by performing interleaving in ECC blocks A and B. Referring to FIG. 13, when ECC blocks A and B are divided at every two lines, respectively, object blocks "a" and "b" have eight partitions (1), (2), (3), (4), (5), (6), (7), and (8), respectively. Object block "a" belongs to ECC block A and object block "b" belongs to ECC block "b". Partition (1) has data 1, 5, 9, ..., 305, partition (2) has data of 309, ..., 613, partition (3) has data of 2, 6, 10, ..., 306, partition (4) has data of 310, ..., 614, partition (5) has data of 311, ..., 615, partition (6) has data of 3, 7, 11, ..., 307, partition (7) has data of 312, ..., 616, and partition (8) has data of 4, 8, 12, ..., 308.

To perform the interleaving, first data is extracted from partition (1), second data is extracted from partition (3), third data is extracted from partition (6), and fourth data is extracted from partition (8). Fifth data is extracted from partition (1), sixth data is extracted from partition (3), seventh data is extracted from partition (6), and eighth data is extracted from partition (8). After extracting all data from partitions (1), (3), (6), and (8), data is alternatively extracted from partitions (2), (4), (5), and (7). This process is repeated at every two lines. Meanwhile, since POs of ECC blocks A and B are 24 lines, respectively, POs of 1.5 lines are equally distributed to each recording unit. As a result, the recording block is created.

As shown in FIG. 13, the recording block is composed of 16 recording units. Each of the recording units has a size of 154×15.5 bytes.

Figure 14:
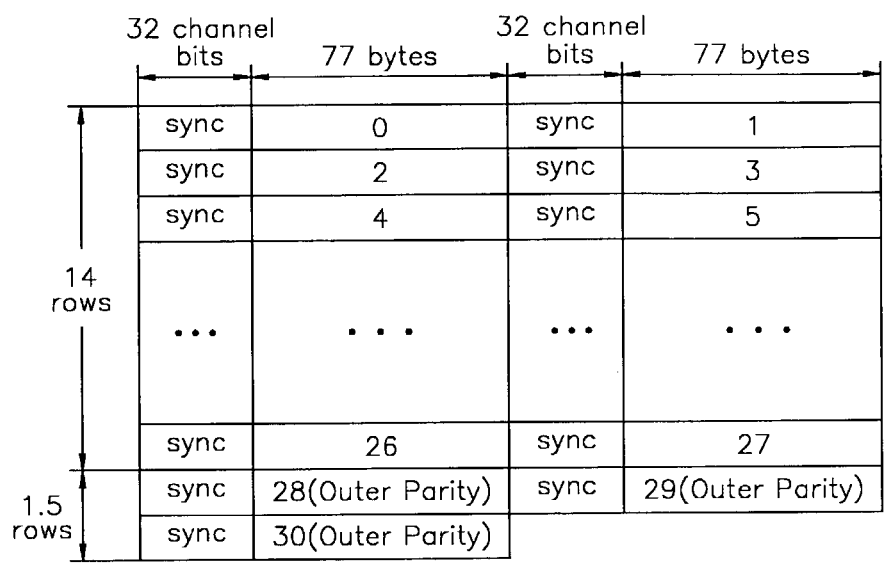
FIG. 14 a view of the configuration of a physical sector according to a modulation algorithm from Table 5.
Figure 18:
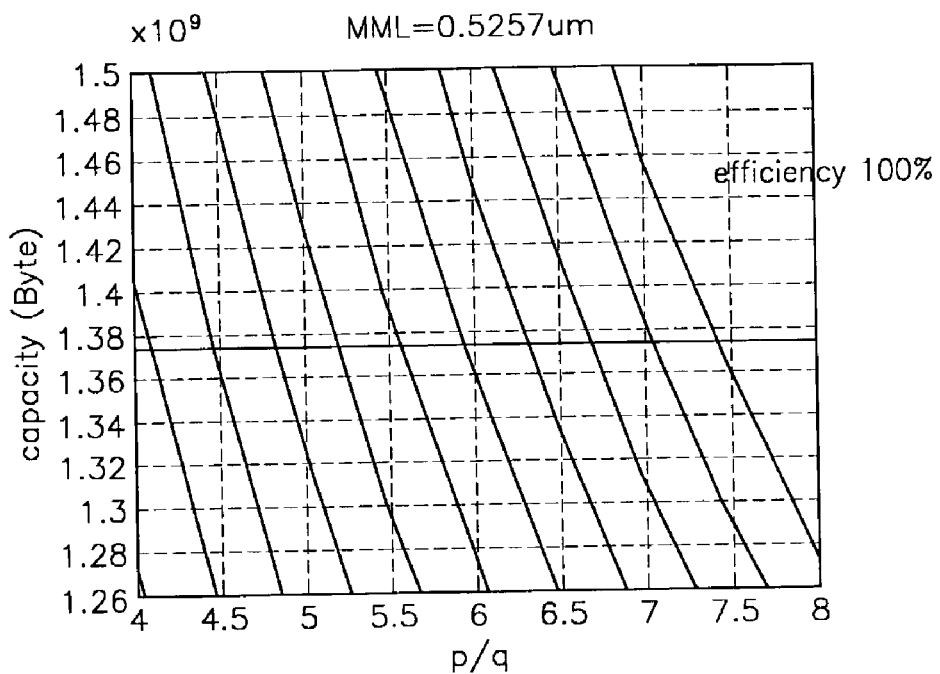
Figure 19:
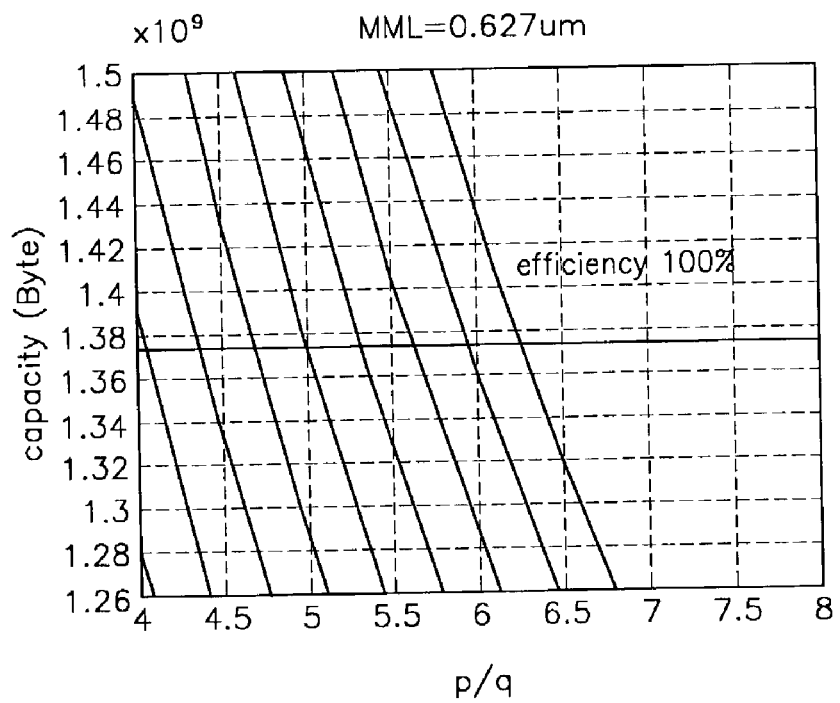
Figure 20:
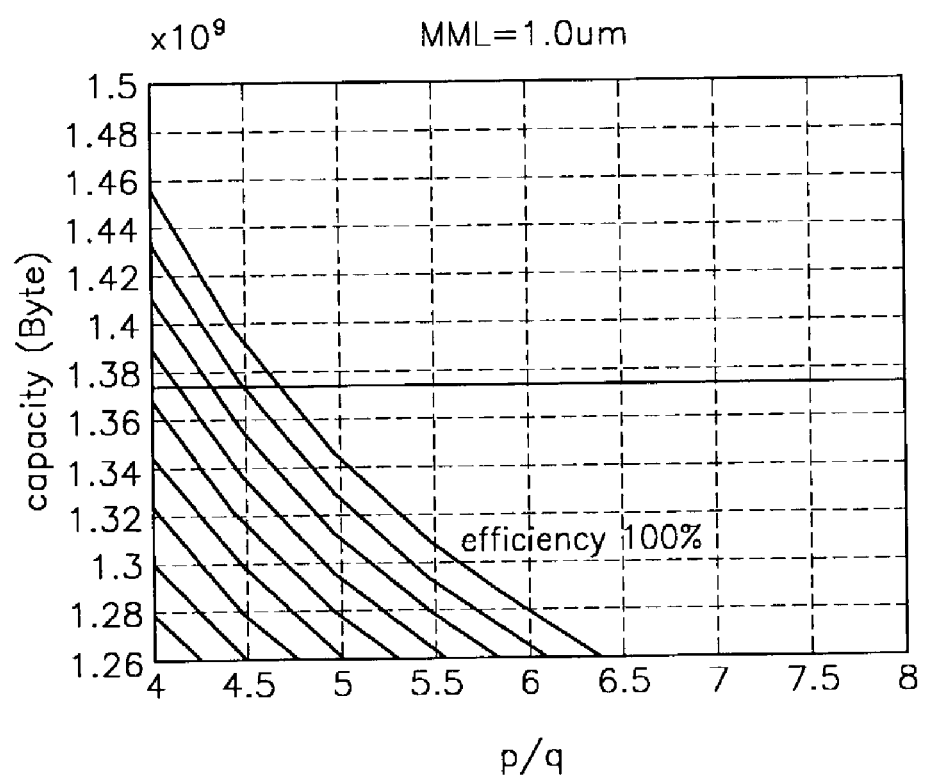
Figure 21:
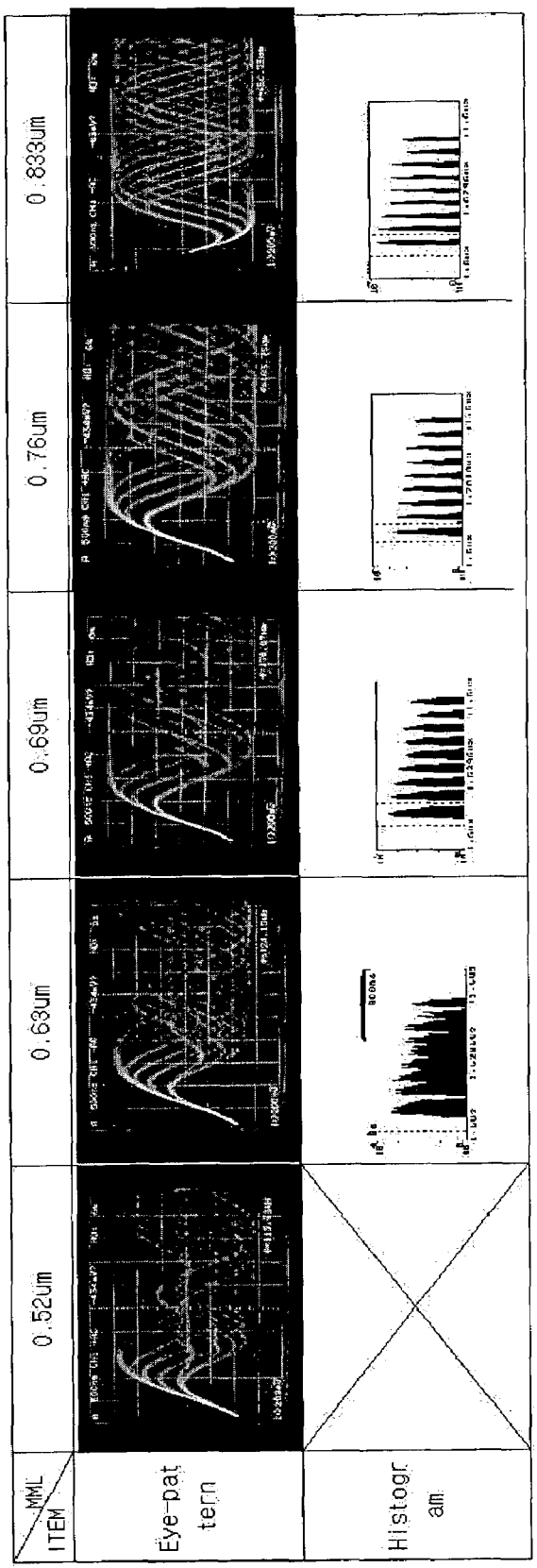
FIGS. 21A through 21E show eye-patterns and histograms thereof, detected when the MML of a recordable CD (CD-R) is 0.52 µm, 0.63 µm, 0.69 µm, 0.76 µm, and 0.833 µm, respectively.
Figure 22:
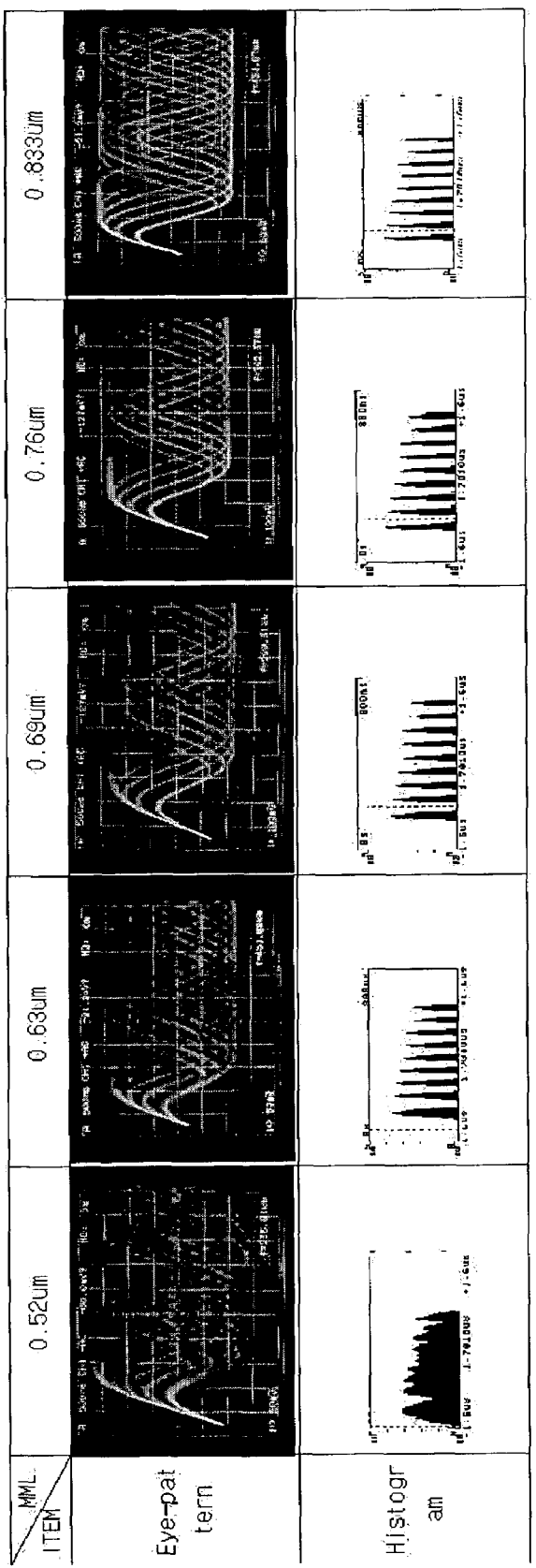
FIGS. 22A through 22E show eye-patterns and histograms thereof, detected when the MML of a rewritable CD (CD-RW) is 0.52 µm, 0.63 µm, 0.69 µm, 0.76 µm, and 0.833 µm, respectively.

FIG. 14 shows the configuration of one physical sector according to the modulation algorithm in Table 4. Referring to FIG. 14, one physical sector is composed of data corresponding to one recording unit of FIG. 18 including 77 bytes and sync codes. In this embodiment, each sync code is composed of 32 channel bits according to the previously described Dual coding method. When a sync code of 32 channel bits and data of 77 bytes form one sync frame, one sector data is composed of 31 sync frames. Here, the number of channel bits being assigned to the sync codes and the sync codes may vary.

Figure 15:
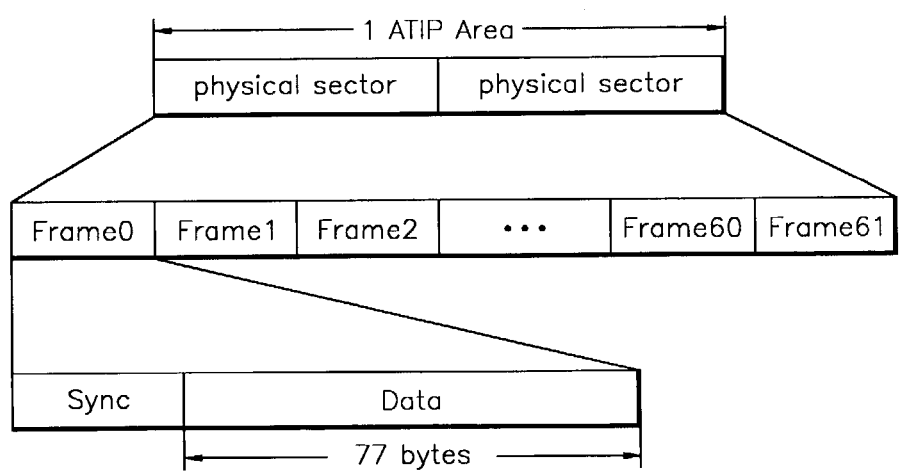
FIG. 15 is a view of the structure of data recorded in an ATIP area (one physical sector area) of a compact disc according to another embodiment of the present invention.

FIG. 15 shows the configuration of data recorded in one ATIP area (one physical sector area) of the recordable compact disc according to the embodiment of the present invention. Referring to FIG. 15, two physical sectors are recorded in one ATIP area (physical sector area) of the recordable compact disc. Each of the physical sectors is composed of 31 sync frames. Each sync frame is composed of a sync code of 32 channel bits and user data of 77 bytes.

According to the present invention, data of about 1.3 GB is recorded on the recordable compact disc according to a writing strategy and Partial Response Maximum Likelihood (PRML) of 0.627 μm based on the specifications of Tables 3 and 4. According to one aspect of the present invention, the writing strategy and PRML of a CD are 0.833 μm. It is possible to change the writing strategy and PRML from 0.833 μm to 0.627 μm without replacing optical parts of an existing pickup. The writing strategy is used for recording a shorter mark and the PRML is used for securing reproduction characteristics.

The recording capacity of a predetermined recording area is obtained from equation 1 based on the Dual modulation algorithm in Table 4.

$$\text{Recording Capacity} = \pi^*((r_2)^2 - (r_1)^2)/(tp^*MML^*15/3), \quad (1)$$

wherein, $r_1$ is the maximum recordable radius, $r_2$ is the minimum recordable radius, tp is a track pitch, and MML is the minimum mark length.

The recording capacity of the predetermined recording area by the EFM method of modulating data of 8 bits to 14 channel bits and a 1-7 modulation algorithm of modulating data of 8 bits to 12 channel bits is respectively obtained from equation 2.

$$\text{Recording Capacity} = \pi^*((r_2)^2 - (r_1)^2)/(tp^*MML^*12/2)$$

$$\text{Recording Capacity} = \pi^*((r_2)^2 - (r_1)^2)/(tp^*MML^*14/3), \quad (2)$$

wherein, $r_1$ is the maximum recordable radius, $r_2$ is the minimum recordable radius, tp is a track pitch, and MML is the minimum mark length.

When data of 8 bits is modulated to p-channel bits and channel bits of the MML is q, the recording capacity is determined by equation 3.

$$\text{Recording Capacity} = \pi^*((r_2)^2 - (r_1)^2)/(tp^*MML^*p/q) \quad (3)$$

The recording capacity of user data is finally calculated by multiplying the recording capacity obtained by equation 3 by format efficiency according to the error correcting system, as represented by equation 4.

$$\text{User Data Capacity} = (\pi^*((r_2)^2 - (r_1)^2)/(tp^*MML^*p/q))$$
$$*\text{format efficiency} \quad (4)$$

Figure 16:
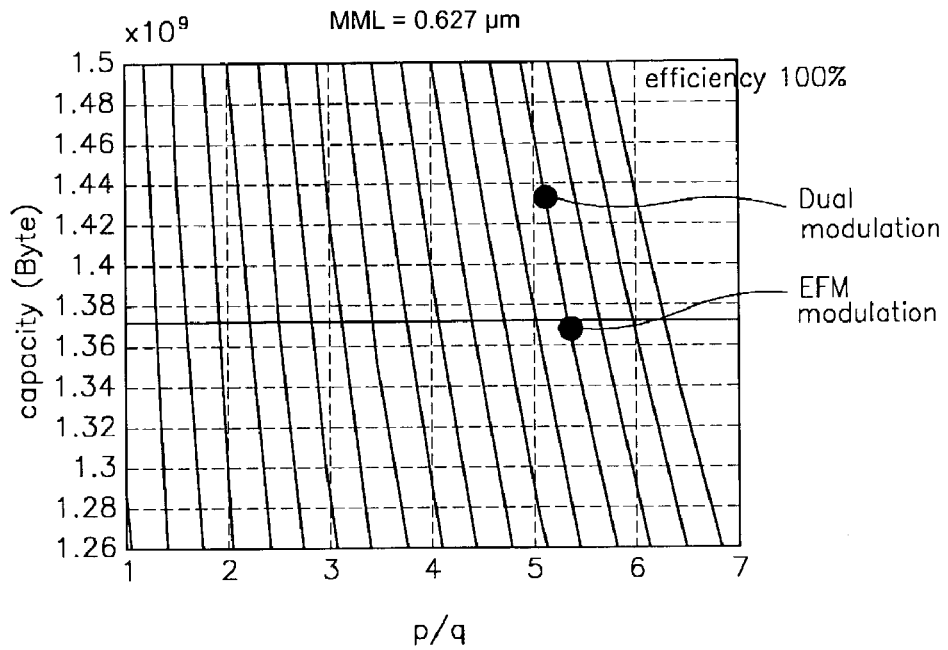
FIG. 16 is a graph showing the relationship between format efficiency and recording capacity depending on modulation algorithms.
Figure 17:
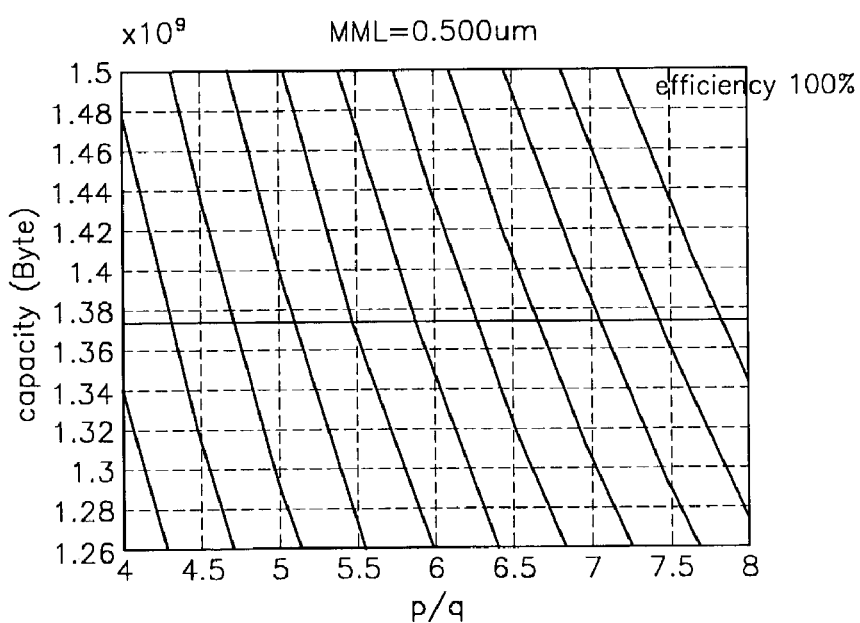
FIGS. 17 through 20 are graphs showing the relationship between format efficiency and recording capacity when the minimum mark length (MML) is 0.50 µm, 0.5257 µm, 0.627 µm, and 1.0 µm, respectively.

FIG. 16 shows the relationship between the format efficiency and capacity of user data according to different modulation algorithms. Referring to FIG. 16, when the MML is 0.627 µm and EFM-based modulation algorithms are used. Each contour represents a constant format efficiency. Adjacent contours represent a 5% changes in the format efficiency. It can be seen that the format efficiency in the Dual modulation algorithm is higher than that in the EFM method. Thus, since the maximum recordable capacity of user data is 688 MB on the existing recording compact disc, it appears from FIG. 16, the following requirements have to be satisfied to record data of 1.3 GB, double the data of 688 MB on the recordable compact disc:

1<p/q<7

15%<format efficiency<100%

Data of 1.3 GB cannot be always recorded on the recordable compact disc by using currently proposed modulation algorithms or modulation algorithms defined by the CD standard and the error correcting system due to the effect of MML depending on modulation algorithms. In other words, if a (1-7)-based modulation algorithm is used in which the MML is 2T, the MML may become shorter.

When the (1-7)-based modulation algorithm using a blue laser beam is the lower limit, the comparison of the optical modulation degrees of the GD and CD is shown in Table 5.

TABLE 5

|  | GD-R/RW | CD-R/RW | Remarks |
|---|---|---|---|
| Wavelength λ of Light Source | 780 µm | | |
| NA of Objective Lens | 0.5 | | |
| MML | 0.627 µm | 0.833 µm | EFM-based |
| Spot/MML | 2.49 | 1.87 | |
| MML2 | 0.5257 µm | | (1-7)-based |

The MML of a modulation algorithm supporting high density (HD) data is 0.527 µm. The recording capacity in this case cannot be 1.3 GB either, although the ratio p/q achieves 100% format efficiency based on EFM-family 5 when the maximum MML is used. Thus, the maximum MML cannot exceed 1.0 µm.

FIGS. 17 through 20 show the relationship between the format efficiency and recording capacity when the MML is 0.50 µm, 0.5257 µm, 0.627 µm, and 1.0 µm, respectively. In FIGS. 17 through 20, when the MML is 0.50 µm, 0.5257 µm, 0.627 µm, and 1.0 µm, respectively, the recording capacity with respect to the ratios of p/q is shown in contours for constant formal efficiencies, with each contour representing a 5% change in the format efficiency as compared to the adjacent contours. Here, the extracted common parameters are the same as those in Table 2. Referring to FIGS. 17 through 20, it can be seen that the recording capacity increases with a reduction in the MML. However, when the MML is overreduced, crosstalk and cross erase between adjacent tracks and adjacent marks causes signal quality to deteriorate when recording/reproducing data. As a result, it is difficult to reproduce data.

FIGS. 21A through 21E show eye-patterns and histograms thereof, detected when the MML is 0.52 µm, 0.63 µm, 0.69 µm, 0.76 µm, and 0.833 µm, respectively. FIGS. 22A through 22E show eye-patterns and histograms thereof, detected when the MML of the CD-RW is 0.52 µm, 0.63 µm, 0.69 µm, 0.76 µm, and 0.833 µm, respectively. In the histograms, the number of data according to the lengths of record marks is shown. Referring to FIGS. 21a through 22E, it can be seen that the MML has to be more than 0.5 µm as shown in Table 2.

Figure 23:
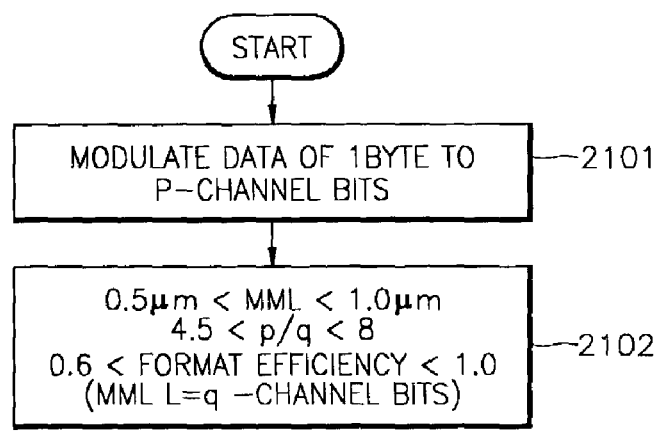
FIG. 23 is a flowchart for explaining a recording method according to an embodiment of the present invention.

Methods of recording data according to embodiments of the present invention will now be described based on the above-described structure. According to the embodiment shown in FIG. 23, in operation 2101, a recording apparatus modulates data of 1 byte that is encoded in a predetermined recording format to p-channel bits. In operation 2102, when recording the modulated data, the MML is between 0.5 µm and 1.0 µm, p/q is between 4.5 and 8 when the MML corresponds to q-channel bits, and a format efficiency is between 0.6 and 1.0.

Figure 24:
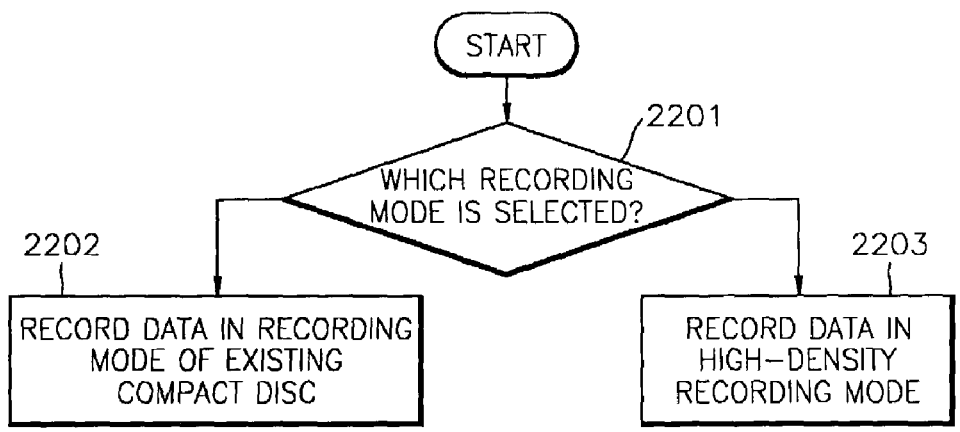
FIG. 24 is a flowchart for explaining a recording method according to another embodiment of the present invention.

FIG. 24 is a flowchart for explaining a recording data according to another embodiment of the present invention. Referring to FIG. 24, in operation 2201, a selection is made as to whether a recording apparatus is to record data by using a first writing mode or a second writing mode, where the first and second writing modes have different recording densities. In other words, in operation 2202, if the selection is to record according to the first writing mode, the data is recorded in a writing mode according to the recording format of an existing compact disc. In operation 2203, if the selection is to record according to the second writing mode, the data is recorded in the high-density writing mode according to the recording format of the GD of the present invention. In other words, in operation 2203, the MML is between 0.5 µm and 1.0 µm, p/q is between 4.5 and 8 when the MML corresponds to q-channel bits, and a format efficiency is between 0.6 and 1.0.

Figure 25:
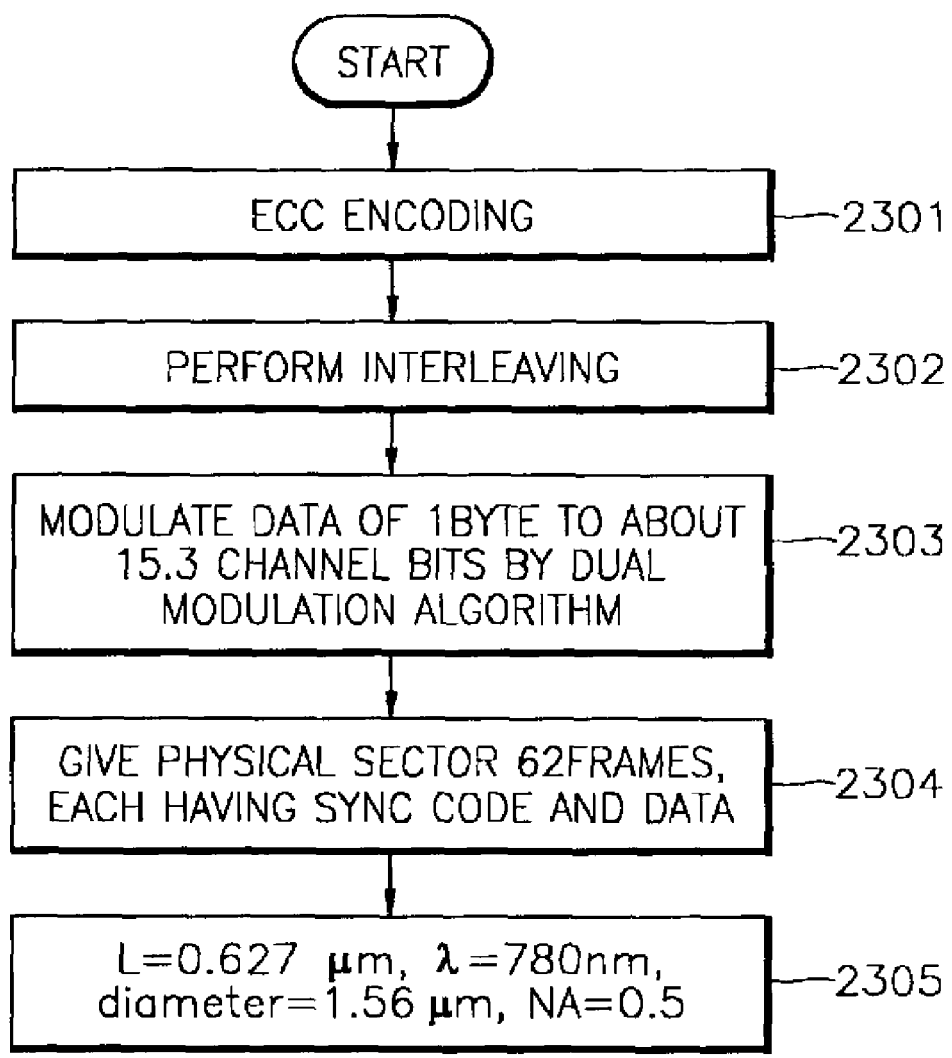
FIG. 25 is a flowchart for explaining a recording method according to still another embodiment of the present invention.

FIG. 25 is a flowchart for explaining a method of recording data according to still another embodiment of the present invention. Referring to FIG. 25, in operation 2301, a recording apparatus creates an ECC block as previously described through an encoding block that is included in or prepared outside the recording apparatus. In operation 2302, interleaving is performed. In operation 2303, data of 1 byte is modulated to 15.3 channel bits by the Dual modulation algorithm. In operation 2304, one ATIP area is given 62 frames, each having a sync code and modulated data. In operation 2305, when recording data, the MML "L" is 0.627 µm, laser wavelength λ is 780 nm, spot diameter is 1.56 µm, and NA is 0.5.

The modulation algorithm and the encoding method used in Table 4 can be changed into another modulation algorithm and another encoding method so long as the recording conditions of Table 2 are satisfied.

As described above, according to the present invention, a method and an apparatus for recording data on an existing compact disc at a high density are provided. Thus, data can be recorded on existing compact discs at a high density using an existing pickup device. Further, since data can be recorded on existing compact discs by selectively using one of an existing recording method and a high-density recording method, a user can very conveniently use the proposed method and apparatus.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data on an optical disc, the method comprising:
   receiving a selection as to a writing mode selected between a first writing mode for recording user data according to a first recording format and a second writing mode for recording user data according to a second recording format; and
   recording user data using the selected writing mode, wherein the recording the user data comprises:
   if the selected writing mode is the first writing mode, modulating user data, and recording modulated user data according to the first recording format, and
   if the selected writing mode is the second writing mode, modulating user data from 1 byte to p-channel bits, and recording modulated user data according to the second recording format such that p/q is between 4.5 and 8 in which the minimum mark length corresponds to q-channel bits, and a format efficiency is between 0.6 and 1.0,
   wherein p is selected within the range of 12 to 17, and q is selected between 2 and 3.

2. The method of claim 1, wherein the recording the user data if the selected writing mode is the second writing mode further comprises modulating user data of 1 byte to about 15.3 channel bits by a dual modulation algorithm.

3. The method of claim 2, wherein before the modulating the user data, the recording the user data if the selected writing mode is the second writing mode further comprises:
   creating an error correcting code block; and
   performing interleaving.

4. The method of claim 3, wherein the creating the error correcting code block comprises creating an error correcting code block of 32 KB.

5. The method of claim 3, wherein the creating the error correcting code block comprises creating the error correcting code block for the minimum mark length of 0.627 µm, a wavelength of a recording beam of 780 nm, a spot diameter of 1.56 µm, and a numerical aperture of 0.5.

6. The method of claim 1, wherein the user data is recorded in 62 frames in physical sectors, each of the frames having a sync code data, and the recording of user data comprises:
   allocating error detecting codes to main data and header information;
   performing error correcting code encoding;
   performing interleaving;
   creating each of the frames by adding the sync code data of 2 bytes to data of 77 bytes; and
   recording the created 62 frames in the physical sectors of the optical disc.

7. The method of claim 6, wherein the performing the interleaving comprises:
   dividing two error correcting code blocks of N1×N2 bytes into blocks of d bytes, where d represents the greatest common divisor along a column of the error correcting code blocks, respectively;
   dividing the object blocks of d×N1 bytes into d parts along a row and a column, respectively, to obtain partitions of d×d; and
   interleaving data in a predetermined partition by alternatively selecting the two error correcting code blocks to obtain a recording block having line-code words of 2×N2.

8. The method of claim 7, wherein the error correcting code blocks has line-code words (N1, k1) and column-code words (N2, k2), respectively, and the performing the interleaving further comprises modulating the recording block having line-code words of 2×N2 to generate a recording block having a main data area of 2×(N2-k2) and an outer parity area of 2×k2.

9. The method of claim 6, wherein the recording the 62 frames in the physical sectors comprises modulating data of 1 byte to 15.3 channel bits by a dual modulation algorithm.

10. An apparatus for recording data on a compact disc, the apparatus comprising:
    a pickup unit which records a mark on the compact disc;
    a modulator which modulates data to predetermined channel bits; and
    a controller which controls the pickup unit so as to record modulated data on the compact disc in a writing mode selectable between a first writing mode and a second writing mode,
    wherein the first and second writing modes have different recording densities,
    wherein, if the selected writing mode is the second writing mode, the controller controls the pickup unit such that p/q is between 4.5 and 8 in which the minimum mark length corresponds to q-channel bits and the data is modulated from 1 byte to p-channel bits, and a format efficiency is between 0.6 and 1.0, and
    wherein p is selected within the range of 12 to 17, and q is selected between 2 and 3.

11. The apparatus of claim 10, wherein, if the selected writing mode is the second writing mode, the modulator modulates data from 1 byte to 15.3 channel bits by a dual modulation algorithm to generate the modulated data to be recorded on the compact disc.

12. The apparatus of claim 11, wherein, if the selected writing mode is the second writing mode, the controller controls the pickup unit such that the minimum mark length is 0.627 µm, a wavelength of a recording beam is 780 nm, a spot diameter is 1.56 µm, and a numerical aperture is 0.5.

13. A computer readable medium encoded with instructions for implementing a method of recording data on a compact disc performed by a computer, the method comprising:
    receiving a selection as to a writing mode selected between a first writing mode for recording user data according to a first recording format, and a second writing mode for recording user data according to a second recording format; and recording user data using the selected writing mode, wherein the recording the user data comprises:

if the selected writing mode is the first writing mode, modulating user data and recording modulated user data on the compact disc according to the first recording format, and if the selected writing mode is the second writing mode, modulating the user data from 1 byte to p-channel bits and recording modulated user data on the compact disc according to the second recording format such that p/q is between 4.5 and 8 in which the minimum mark length corresponds to q-channel bits, and a format efficiency is between 0.6 and 1.0, wherein p is selected within the range of 12 to 17, and q is selected between 2 and 3.

14. The computer readable medium of claim 13, wherein the recording the user data if the selected writing mode is the second writing mode further comprises modulating the user data from 1 byte to about 15.3 channel bits by a dual modulation algorithm.

15. The computer readable medium of claim 13, wherein before the modulating the user data, the recording the user data if the selected writing mode is the second writing mode further comprises:

creating an error correcting code block; and performing interleaving.

16. The computer readable medium of claim 15, wherein the creating the error correcting code block comprises creating an error correcting code block of 32 KB.

17. The computer readable medium of claim 15, wherein the creating the error correcting code block comprises creating the error correcting code block for the minimum mark length of 0.627 µm, a wavelength of a recording beam of 780 nm, a spot diameter of 1.56 µm, and a numerical aperture of 0.5.

18. The computer readable medium of claim 13, wherein: the received data is recorded in 62 frames, each of the frames having a sync code data and the user data having been modulated from 1 byte to p-channel bits, and the compact disc has a plurality of physical sectors designated by addressing information that is recorded in a mastering process.

19. The computer readable medium of claim 18, wherein the recording the 62 frames of data comprises:

allocating error detecting codes to main data and header information;

performing error correcting code encoding;

performing interleaving;

creating each of the frames by adding the sync code data of 2 bytes to data of 77 bytes; and recording the created 62 frames in the physical sectors on the compact disc.

20. The computer readable medium of claim 19, wherein the performing the interleaving comprises:

dividing two error correcting code blocks of N1×N2 bytes into blocks of d bytes, where d represents the greatest common divisor along a column of the error correcting code blocks, respectively;

dividing the object blocks of d×N1 bytes into d parts along a row and a column, respectively, to obtain partitions of d×d; and interleaving data in a predetermined partition by alternatively selecting the two error correcting code blocks to obtain a recording block having line-code words of 2×N2.

21. The computer readable medium of claim 20, wherein the error correcting code blocks has line-code words (N1, k1) and column-code words (N2, k2), respectively, and the performing the interleaving further comprises modulating the recording block having line-code words of 2×N2 to generate a recording block having a main data area of 2×(N2−k2) and an outer parity area of 2×k2.

22. The computer readable medium of claim 19, wherein the recording the 62 frames in the physical sectors comprises modulating the user data from 1 byte to 15.3 channel bits by a dual modulation algorithm.

* * * * *